(12) United States Patent
Jackson (10) Patent No.: US 11,801,911 B1
(45) Date of Patent: Oct. 31, 2023

(54) TRAILING LINK SUSPENSION FOR A BICYCLE

(71) Applicant: Stuart Jackson Consulting, LLC, Glencoe, IL (US)

(72) Inventor: Stuart Jackson, Glencoe, IL (US)

(73) Assignee: Stuart Jackson Consulting, LLC, Teton Village, WY (US)

( * ) Notice: Subject to any disclaimer, the term of this patent is extended or adjusted under 35 U.S.C. 154(b) by 0 days.

(21) Appl. No.: 17/887,207

(22) Filed: Aug. 12, 2022

(51) Int. Cl.
    *B62K 25/16* (2006.01)
(52) U.S. Cl.
    CPC .......... *B62K 25/16* (2013.01); *B62K 2201/00* (2013.01)
(58) Field of Classification Search
    CPC ...................................... B62K 25/16
    See application file for complete search history.

(56) References Cited

U.S. PATENT DOCUMENTS

| 407,930 | A | * | 7/1889 | Hill | B62K 25/16 |
|---|---|---|---|---|---|
| | | | | | 280/277 |
| 475,207 | A | * | 5/1892 | Edwards | B62K 25/16 |
| | | | | | 280/277 |
| 477,179 | A | * | 6/1892 | Halladay | B62K 25/16 |
| | | | | | 280/277 |
| 2,596,411 | A | * | 5/1952 | Jordan | B62K 25/16 |
| | | | | | 267/281 |
| 4,180,280 | A | * | 12/1979 | Doveri | B62K 25/005 |
| | | | | | 188/26 |
| 4,186,936 | A | * | 2/1980 | Offenstadt | B62K 25/16 |
| | | | | | 280/277 |
| 4,776,609 | A | * | 10/1988 | Pan | B62K 25/16 |
| | | | | | 280/124.105 |
| 6,702,312 | B1 | * | 3/2004 | Miksik | B62M 3/00 |
| | | | | | 280/278 |
| 7,775,314 | B2 | * | 8/2010 | Blais | B62K 25/16 |
| | | | | | 180/227 |
| 2004/0227317 | A1 | * | 11/2004 | Cheng | B62K 3/002 |
| | | | | | 280/87.041 |

FOREIGN PATENT DOCUMENTS

| CN | 201283985 | Y | * | 8/2009 | |
|---|---|---|---|---|---|
| CN | 102963476 | A | * | 3/2013 | |
| CN | 202827946 | U | * | 3/2013 | |
| CN | 203094335 | U | * | 7/2013 | |
| CN | 203142932 | U | * | 8/2013 | |
| NL | 2025609 | B1 | * | 12/2021 | |
| WO | WO-2019096680 | A1 | * | 5/2019 | B60K 1/04 |

* cited by examiner

*Primary Examiner* — Tony H Winner
*Assistant Examiner* — Hosam Shabara
(74) *Attorney, Agent, or Firm* — Hathaway P. Russell; Stephen J. Kenny; Foley Hoag LLP (57) ABSTRACT

A trailing link suspension for a bicycle includes at least one fork arm. The fork arm including a proximal end and a distal end defining a non-linear portion disposed between generally straight portions such that the distal end is at an angle of approximately 70°~90° relative to the proximal end. The fork arm is rotatably fixed to a bicycle frame. The suspension includes a shock absorber comprising a first end and a second end, defining a length therebetween. The first end of the shock absorber rotatably fixed to the non-linear portion. The suspension includes a link including a first end and a second end defining a length therebetween. The second end of the shock absorber is rotatably fixed to the link, the first end of the link fixed to the second end of the fork arm and the second end of the link fixed to an axle.

19 Claims, 9 Drawing Sheets

TRAILING LINK SUSPENSION FOR A BICYCLE

BACKGROUND OF THE DISCLOSED SUBJECT MATTER

Field of the Disclosed Subject Matter

The disclosed subject matter relates to a system for a vehicle suspension. Particularly, the present disclosed subject matter is directed to a front-wheel trailing link suspension system configured for use with a bicycle.

Description of Related Art

It has been over one hundred years since the invention of the standard bicycle, and it is largely unchanged. As a means of converting human energy into efficient transportation, there is no match, and with e-bikes, there is now the possibility of extended range and speed. With a new focus on environmental sustainability and the benefit of millions of miles of bike lanes, the bike is having a resurgence. But the bicycle has a significant safety flaw: in the event of pothole or road obstruction, the consequent deceleration combined with the high center of gravity of the rider can quickly lead to an over the handlebars fall. Recumbent bikes are a solution, but most people do not like the idea of being so close to the ground. Every year many adults and children suffer serious injuries as a result of over-the-handlebars bike falls, in certain instances requiring facial reconstructive surgery and/or requiring spinal surgery. According to the NHTSA, there were more than 49,000 police-reported bicycle injuries in the U.S. for the latest reporting year (2019). Since police are not always involved, the actual number of injuries is likely to be much higher.

There thus remains a need for an efficient and economical solution. The proposed innovation is a trailing-link front fork suspension that absorbs the impact of an obstruction impact at moderate speed in a way that a standard bike or a "mountain bike" with telescoping front suspension cannot do.

SUMMARY OF THE DISCLOSED SUBJECT MATTER

The purpose and advantages of the disclosed subject matter will be set forth and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a front-wheel trailing link suspension for a bicycle. The trailing link suspension includes at least one fork arm, the fork arm including a proximal end and a distal end defining a non-linear portion therebetween. The proximal end of the fork arm is rotatably fixed to at least a portion of a bicycle frame. A shock absorber, the shock absorber comprising a first end and a second end, defining a variable length therebetween. The first end of the shock absorber rotatably fixed to the non-linear portion of the fork arm. The trailing link suspension includes a link, the link including a first end and a second end defining a link length therebetween, wherein the second end of the shock absorber is rotatably fixed to the link length. The first end of the link fixed to the distal end of the fork arm and the second end of the link fixed to an axle.

The disclosed subject matter also includes a trailing link suspension for a bicycle. The trailing link suspension includes a fork, the fork including two fork arms disposed laterally parallel. Each of the two fork arms extending from a common junction to a distal end. Each of the two fork arms comprising a non-linear portion extending from the common junction to the distal ends. The trailing link suspension includes two links disposed laterally parallel and opposite, each of the links comprising a first end a second end, defining a link length therebetween. Each of the links rotatably fixed to the distal end of the fork arms, each of the links rotatably fixed to an axle. The trailing link suspension includes two shock absorbers, each of the two shock absorbers comprising a first end and a second end, defining a variable length therebetween. Each of the shock absorbers rotatably fixed to the non-linear portion of the fork arm at the first end shock absorber and rotatably fixed to the link length at the second end of the shock absorber.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1A:
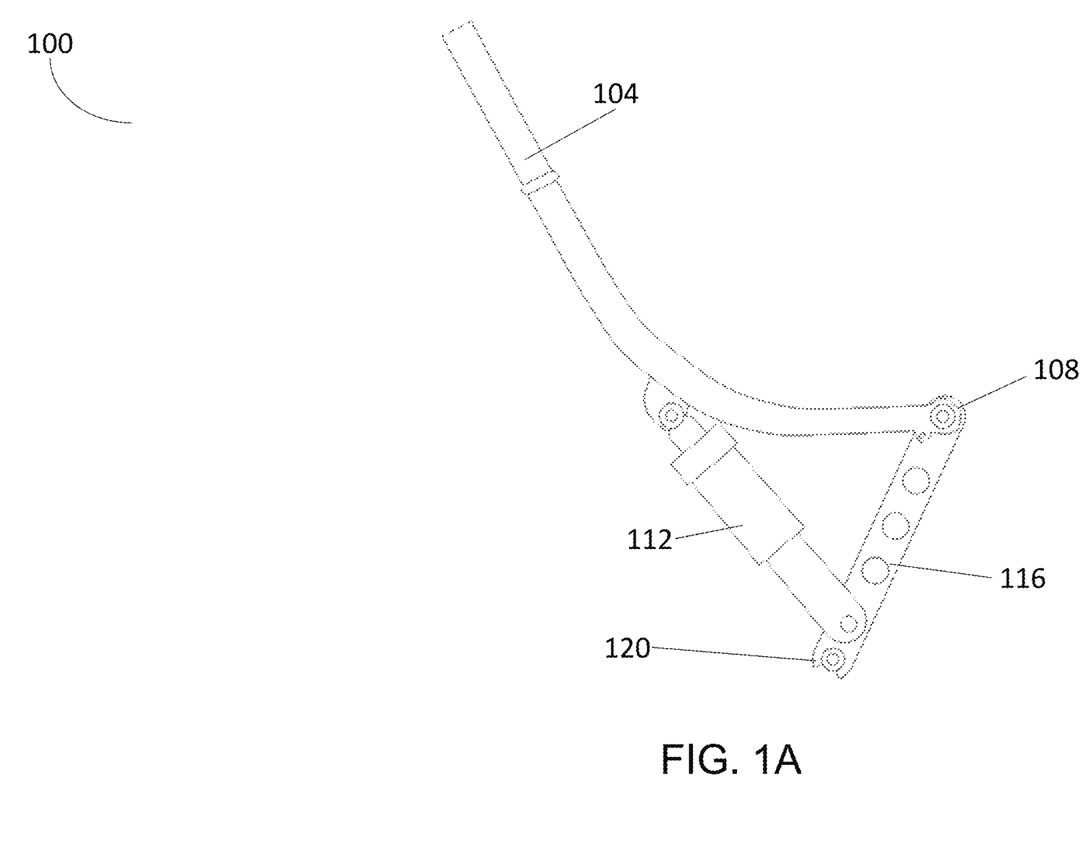
FIG. 1A is a schematic representation of a trailing link suspension for a bicycle in accordance with the disclosed subject matter.

The methods and systems presented herein may be used for a trailing link suspension for a bicycle. The disclosed subject matter is particularly suited for a trailing link suspension configured for use with a front wheel of a bicycle. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

As shown in FIG. 1A, a trailing link suspension 100 for use with a bicycle is presented in side schematic view. Trailing link suspension 100 may be mounted on the front wheel of a bicycle and configured to absorb impact upon striking a pothole or obstruction. Trailing link suspension 100 may in some embodiments be mounted on a rear wheel of a bicycle in addition to the front wheel. In some embodiments trailing link suspension 100 may be mounted on only the rear wheel of the bicycle. The trailing link suspension 100 absorbs the forces that act upwards and backwards on the front wheel in the event of a collision with an obstruction in the path of the bicycle such as the lip of a pothole, a fallen branch or a protruding drain cover. Of the upward and backward forces, the backward force is the most dangerous, since this is what causes the bicycle to decelerate. As the bicycle decelerates, the center of gravity of the rider being above the handlebars, there will be a tendency for the rider to lift out of the saddle and pivot forward over the handlebars of the bicycle. If deceleration is high enough, this pivoting force will be enough to make the rider lift up out of their saddle and fly forwards over the handlebars. Conventional telescopic suspensions systems do a poor job of absorbing the more dangerous backward forces involved in collision with an obstacle at moderate or high speed. Suspension 100 may be a mechanical linkage such as a rigid linkages connected by pins or other joint types, in order to manage forces and movement of the system.

With continued reference to FIG. 1A, trailing link suspension 100 includes at least one fork arm 104. Fork arm 104 includes a proximal end and a distal end, defining a non-linear portion therebetween. In some embodiments the fork arm may include a proximal end coincident with junction point of a second fork arm. For example and without limitation, fork arm 104 may be mechanically fixed to a second fork arm at a single point, and extend on in a single component, for example in a stem configured to couple to at least a part of a bicycle frame such as the steering column. Fork arm 104 may include a proximal end configured for use with one or more bearings such as ball bearings, sleeve bearings, flexure bearings, and the like. One of ordinary skill in the art would understand the plurality of bearings usable to couple the proximal end of fork arm 104 to a portion of a bicycle frame. The proximal end of bicycle frame may be rotatably coupled to the portion of the bicycle frame and configured to allow a rider to steer the bicycle when assembled. Fork arm 104 may be constructed from metal, metal alloys, composites, plastics, a combination thereof, or the like. For example and without limitation, fork arm 104 may be constructed from aluminum or aluminum alloys such as 1000, 2000, 3000, 4000, 5000, 6000, 7000, 8000, and/or 9000 series alloys. Fork arm 104 may include carbon fiber composite components or be made wholly of resin-impregnated carbon fiber sheets, cured in a mold to the shape of the fork arm 104. In some embodiments and according to material, fork arm 104 may be cast, molded, machined, cut, or otherwise shaped from raw material.

Fork arm 104 includes a distal end 108, defining a non-linear portion between said distal end and said proximal end. Fork arm 104 may include one or more curves to optimize axle location as described herein below. Fork arm 104 may include one curve such as an arc of a circle. Fork arm 104 may include one or more straight lengths fixed at one or more angles such as a right angle (e.g., a rectangular length). In some embodiments, fork arm 104 may include a non-linear portion formed from a plurality of straight members fixed at obtuse angles to form a generally curved portion. In some embodiments, fork arm 104 may include a non-linear portion formed from a plurality of curved members fixed at acute, obtuse, or a combination thereof angles to form a generally curved portion. In some embodiments, the fork arm can include a proximal end and a distal end defining a length therebetween that has a non-linear portion disposed between generally straight portions such that the distal end is at an angle of approximately 70°~90° relative to the proximal end. The curvature can have a constant radius of curvature for a smooth, gradual transition between first and second ends of the fork. Additionally or alternatively, a plurality of discrete radii of curvature can be formed within the curved transition zone between first and second ends of the fork. Fork arm 104 may include a partially straight and partially non-linear portion combined. Fork arm 104 includes said distal end 108. The distal end includes one or more features configured to fix one or more other components such as a hole, threaded hole, cutout, machined slot, flex joint, or the like. In some embodiments the distal end 108 includes an open feature configured to capture or partially capture a pin, screw, bolt, dowel, or other feature configured to constrain motion to one degree of freedom. For example and without limitation, distal end 108 may include a hole, pass through or other feature capable of received a cylindrical fastener configured to rotatably fix fork arm 104 to link 116, as can be seen in FIG. 1A. For example and without limitation, distal end 108 may include a cutout open for a portion configured for a quick release of link 116 from distal end 108 of fork arm 104, with a bolt and nut able to be passed through to another component, such as the link as described below. The distal end 108 allows for rotation of fork arm 104 relative to the link. For example and without limitation, distal end 108 includes a flex joint. Distal end 108 may include one or more other types of bearings such as ball bearings, sleeve bearings, collar bearings, roller bearings, fluid bearings, magnetic bearings, plain bearings, and the like. Distal end 108 may include a shaft capable of rotation in within a collar, partial collar, or other type of circular receptacle. Fork 104 may be formed from titanium or carbon fiber composite. Any component described herein may be formed from carbon fiber or alternative resin-impregnated composites, or other types of composites. Fork arm 104 may be formed from steel alloys such as SAE 4130.

With continued reference to FIG. 1A, trailing link suspension 100 includes shock absorber 112. Shock absorber 112 includes a first end and a second end, defining a variable length therebetween. For example, shock absorber 112 may include a first length under no additional force, as for example when installed in a suspension, and another length or range of lengths when compressed. Shock absorber 112 may be configured to linearly change length, or bend, contort or otherwise change shape other than linearly to absorb force and impulse, for example like a column bending. The shock absorber 112 can be biased such that after the impact force is removed, the shock absorber extends back to its original/default position or length. Shock absorber 112 may include the first end rotatably fixed to the curbed length of fork arm 104. Shock absorber 112 may include one or more holes or features configured to accept a pin coaxially installed in a feature disposed on non-linear portion of fork arm 104. For example and without limitation, shock absorber 112 may include a hole weldably fixed to the first end of shock absorber 112, that hole is coaxially aligned with a hole weldably fixed to the exterior of non-linear portion of fork arm 104. In some embodiments, the hole in non-linear portion of fork arm 104 may be machined or molded into the body of non-linear portion of fork arm 104.

With continued reference to FIG. 1A, shock absorber 112 may be any component configured to change lengths, rotate relative to one or more other components, and absorb force imparted to the suspension when a bicycle interacts with a surface abnormality (e.g. pothole, speedbump, curb, or other obstruction). One of ordinary skill in the art would appreciate that shock absorber 112 is any component configured to dampen and absorb impulses. Shock absorber 112 may include a dashpot component which resists motion (linearly) via viscous friction, wherein oil is forced through one or more holes on a plunger head in a piston, in embodiments. Shock absorber 112 may include a pneumatic piston which utilizes pressure in a piston in the form of a captured gas (not limited to air) to resist motion in a linear direction. Shock absorber 112 may include a hydraulic piston which utilizes hydraulic pressure in the form of a liquid such as oil to resist linear motion. Shock absorber 112 may include a leaf spring, coil spring, or a plurality of said springs, alone or in combination. In some embodiments, shock absorber 112 may be configured to have an adjustable stiffness. For example and without a limitation the force it takes to compress a shock absorber 112 may adjustable by one or more riders or users. The force settings of the one or more shock absorbers 112 may be adjustable to provide maximum protection to the rider, taking account of the rider's weight and riding attributes (speed, seat height relative to handlebars, smooth or rough roads), these settings, in some embodiments, corresponding to a rider's weight, ability, or preferences. In the case of a pneumatic piston, the resistance force is configured by adjusting the forward and backward pressures in the cylinder. In some embodiments, the apertures within a piston head within a hydraulic piston may be expanded or contracted in order to increase viscous friction, thereby changing the "stiffness" of the shock absorber. Additionally or alternatively, shock absorber 112 may be configured to have adjustable travel. For the purposes of this disclosure, "travel" in reference to shock absorber 112 is the change in length of shock absorber in the expanded state versus fully compressed state. Travel may also be the range of motion of the shock absorber 112, a plurality thereof, or any of the systems described herein. Travel, when referring to nonlinearly traveling shock absorbers 112 may include the deflection of a bending member from an expanded state to a fully compressed state.

Shock absorber 112 may include more than one dampening system, such as a spring and a damper. The spring may be implemented with a steel or titanium coil, compressed air, or even an elastomer. Different spring materials have different spring rates which have a fundamental effect on the characteristics of the fork as a whole. Coil-sprung forks keep an approximately constant ("linear") spring rate throughout their travel. The spring rate of air-sprung forks however increases with travel, making them progressive.

Air springs work by using the characteristic of compressed air to resist further compression. As the spring itself is provided by the compressed air rather than a coil of metal it is much lighter. Another advantage of this type of fork design is that the spring rate can easily be adjusted by changing the air pressure within the fork. This allows a fork to be effectively tuned to a rider's weight. However air pressure naturally controls both spring rate and preload at the same time, requiring air forks to have additional systems to adjust preload separately, adding to its complexity. The use of two air chambers within the system has allowed a more linear feel to air suspension, this is achieved by having a 'reserve' chamber that becomes connected to the main chamber when it reaches a certain amount of compression. Once achieved, a valve opens and effectively makes the chamber larger. By linking the two, the force needed to compress the air in the chambers is reduced which reduces the exponential spring rate feel traditionally associated with air systems when approaching the end of the suspension's travel.

With continued reference to FIG. 1A, trailing link suspension 100 includes a link 116. Link 116 includes a first end and a second end, defining a link length therebetween. Link 116 may be a substantially straight bar constructed from metal, metal alloy or composite as described above. Link 116 may be a substantially curved bar defining a non-linear portion therebetween. Link 116 is rotatably fixed to distal end 108 of fork arm 104. Link 116 may be coaxially and rotatably fixed to distal end 108 by a pin concentrically disposed in a plurality of holes or sleeves fixed to each component. Link 116 may be fixed to fork arm 104 such that they form an acute angle, that is to say, link 116 may be angled substantially back towards the direction of fork arm 104 approach, thereby locating axle 120 (described below) behind distal end 108. For example and without limitation, link 116 and fork arm 104 may be fixed such that the angle before shock absorber 112 is compressed is greater than the angle when shock absorber 112 is compressed. For example and without limitation, link 116 may be fixed at a 30 degree angle from fork arm 104 and rotate to 10 degrees such that it is 20 degrees from fork arm 104 when shock absorber 112 is compressed. One of ordinary skill in the art would appreciate these are only examples, and a plurality of angles and arrangements may be suitable for the described system. As shown in the exemplary embodiment in FIG. 1A, the fork 104, shock absorber 112, and link 116 are configured to form a triangular shaped union, with no structural features disposed within the interior of the triangle. Link 116 may include one or more cutouts along the link length configured to lighten the weight of link 116. Link 116 may include a hole, threaded hole, slot, configured to accept a pin, bolt, screw, nail or otherwise from a second end of shock absorber 112. Shock absorber 112 may be rotatably fixed to link 116 along the link length. The link length point at which shock absorber 112 is rotatably fixed may be adjustable or variable.

With continued reference to FIG. 1A, the first end of link 116 may be rotatably fixed to the distal end of fork arm via a flex joint. The flex joint may be configured to allow one or more components, namely fork arm 104, to rotate slightly relative to the link 116 during compression of trailing link suspension 100. The second end of link 116 is rotatably fixed to axle 120. Axle 120 may be configured to rotate with a wheel to which it is fixed, or stay stationary and allow the wheel to rotate around said axle 120. In the former case, bearings or bushings are provided at the mounting points where axle 120 is supported. In the latter case, a bearing or bushing sits inside a central hole in the wheel to allow the wheel or gear to rotate around the axle. Sometimes, especially on bicycles, the latter type axle is referred to as a spindle. Axle 120 may be an integral component of the wheel, in embodiments. In some embodiments, the axles serve to transmit driving torque to the wheel, as well as to maintain the position of the wheels relative to each other and to the bicycle frame/body. Axle 120 in trailing link suspension 100 may also bear part of the weight of the bicycle and rider plus any cargo. As shown in FIG. 1A, the second end of link 116 may include a cut out or quick release feature for dismounting the axle 120 (and therefore wheel 124 from the suspension 100. The second end of link 116 may include a retaining feature such as a hook, slot or other gravity-assisted feature that keeps axle 120 from dislodging itself from link 116. For example and without limitation, a slot in a top facing portion of link 116 may receiving axle 120 in a downward fashion, and then secured by a bolt, latch or otherwise discussed hardware. One of ordinary skill in the art would appreciate this is only one of a plurality of options for rotatably fixing axle 120 to link 116. Axle 120 may be fixed to axle 120 by a squared hole, wherein the ends of axle 120 may include a squared edges on a threaded shaft wherein the squared section is inserted in a wheel hub of wheel 124. The squared hole may prevent canting of the wheel in the situation wherein one of two shock absorbers 112 do not compress the same distance (range of motion).

Still referring to FIG. 1A, trailing link suspension 100 may include a brake. The brake may include a drum, or disc, brake. A drum brake is a brake that uses friction caused by a set of shoes or pads that press outward against a rotating cylinder-shaped part called a brake drum. A drum brake may employ shoes that press on the inner surface of the drum. When shoes press on the outside of the drum, it is usually called a clasp brake. Where the drum is pinched between two shoes, similar to a conventional disc brake, it is sometimes called a pinch drum brake, though such brakes are relatively rare. A related type called a band brake uses a flexible belt or band wrapping around the outside of a drum.

Brakes employed with the suspension 100 may include brake calipers. Brake calipers may be disposed around the wheel of a bicycle and configured to, upon squeezing of a lever, apply pressure to at least one side of wheel and arrest the motion of the spinning wheel by friction. Further, the wheel of the bicycle may include one or more wheels fixed to the one or more sides of the wheel, this secondary wheel may include a brake caliper disposed around it, thereby applying pressure and therefore friction to the smaller wheel and due to the coupling to the larger wheel, arrests motion of the larger wheel, as described in reference to FIGS. 7A and 7B.

Figure 1B:
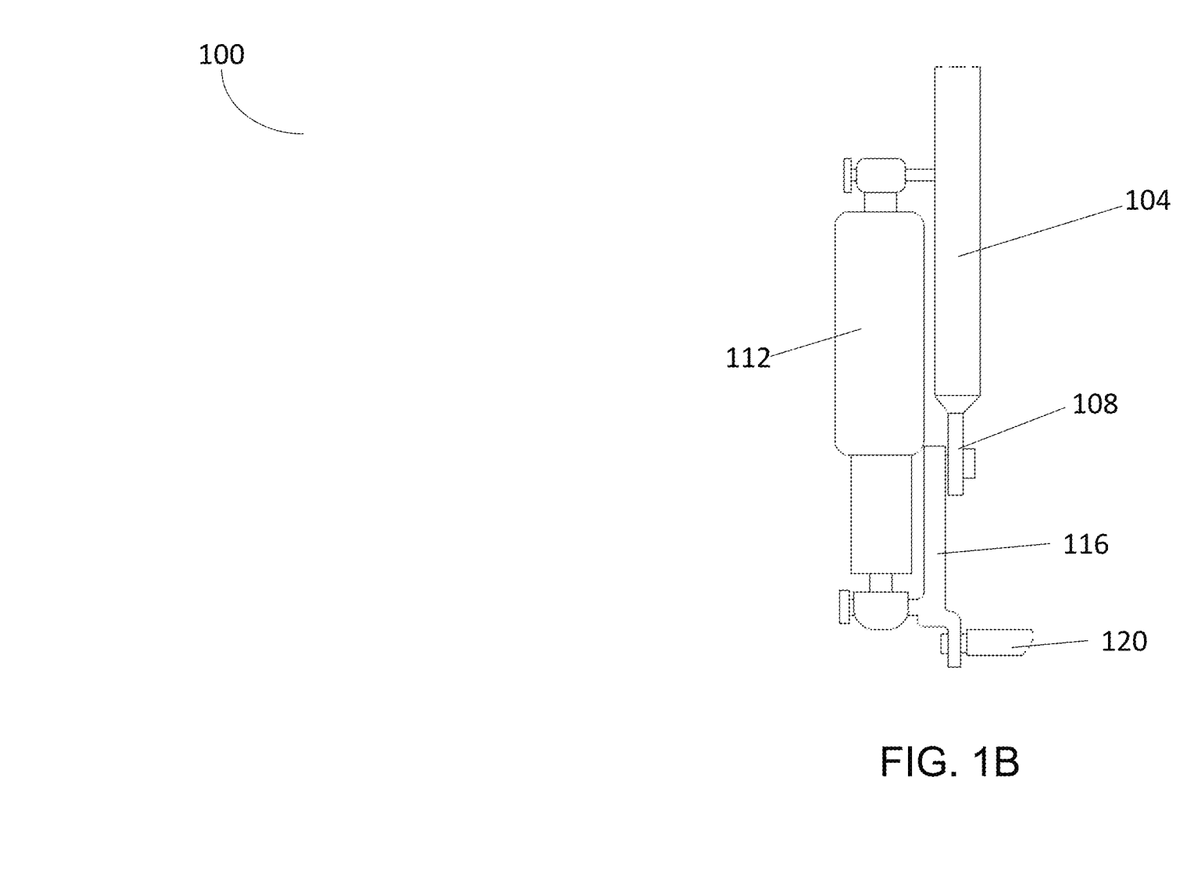
FIG. 1B is a schematic front view of the trailing link suspension for a bicycle shown in FIG. 1A.

Referring now to FIG. 1B, trailing link suspension 100 is shown in front schematic view. The same components as FIG. 1A can be seen from an orthogonal view 90 degrees rotated from FIG. 1A. Here fork arm 104 can be seen as a substantially straight member, though one of ordinary skill in the art would appreciate that the curve as described of fork arm 104 lies within the axis in line with the view of the figure. Here a perpendicularly disposed pin protrudes leftward from fork arm 104 which is captured by a first end of shock absorber 112. Shock absorber 112 includes a first end including a hole, channel, slot, or other feature configured to constrain the movement of shock absorber 112 and fork arm 104 in two degrees of freedom. That is to say that shock absorber 112 is constrained to only rotate about the pin in a plane perpendicular to the view FIG. 1B.

Shock absorber 112 may be configured to linearly change length, or bend, contort or otherwise change shape other than linearly to absorb force and impulse, for example like a column bending. Shock absorber 112 may include the first end rotatably fixed to the curbed length of fork arm 104. Shock absorber 112 may include one or more holes or features configured to accept a pin coaxially installed in a feature disposed on non-linear portion of fork arm 104. For example and without limitation, shock absorber 112 may include a hole weldably fixed to the first end of shock absorber 112, that hole is coaxially aligned with a hole weldably fixed to the exterior of non-linear portion of fork arm 104. In some embodiments, the hole in non-linear portion of fork arm 104 may be machined or molded into the body of non-linear portion of fork arm 104.

With continued reference to FIG. 1B, shock absorber 112 may be any component configured to change lengths, rotate relative to one or more other components, and absorb force imparted to the suspension when a bicycle interacts with a pothole or obstruction. One of ordinary skill in the art would appreciate that shock absorber 112 is any component configured to dampen and absorb impulses. Shock absorber 112 may include a dashpot component which resists motion (linearly) via viscous friction, wherein oil is forced through one or more holes on a plunger head in a piston, in embodiments. Shock absorber 112 may include a pneumatic piston which utilizes pressure in a piston in the form of a captured gas (not limited to air) to resist motion in a linear direction. Shock absorber 112 may include a hydraulic piston which utilizes hydraulic pressure in the form of a liquid such as oil to resist linear motion. Shock absorber 112 may include a leaf spring, coil spring, or a plurality of said springs, alone or in combination. In some embodiments, shock absorber 112 may be configured to have an adjustable stiffness. For example and without a limitation the force it takes to compress a shock absorber 112 may adjustable by one or more riders or users.

With continued reference to FIG. 1B, suspension 100 includes link 116 as described with reference to FIG. 1A. Link 116 may be a substantially straight bar constructed from metal, composite or metal alloy such as aluminum as described above. Link 116 may be a substantially curved bar defining a non-linear portion therebetween. Link 116 is rotatably fixed to distal end 108 of fork arm 104. Link 116 may be coaxially and rotatably fixed to distal end 108 by a pin concentrically disposed in a plurality of holes or sleeves fixed to each component. Link 116 may include one or more cutouts along the link length configured to lighten the weight of link 116. Link 116 may include a hole, threaded hole, slot, configured to accept a pin, bolt, screw, nail or otherwise from a second end of shock absorber 112. Shock absorber 112 may be rotatably fixed to link 116 along the link length. The link length point at which shock absorber 112 is rotatably fixed may be adjustable or variable.

Still referring to FIG. 1B, suspension 100 includes the link 116 described in FIG. 1A. The first end of link 116 may be rotatably fixed to the distal end of fork arm via a flex joint. The flex joint may be configured to allow one or more components, namely fork arm 104, to rotate slightly relative to the link 116 during compression of trailing link suspension 100. The second end of link 116 is rotatably fixed to axle 120. Axle 120 may be configured to rotate with a wheel to which it is fixed, or stay stationary and allow the wheel to rotate around said axle 120. In the former case, bearings or bushings are provided at the mounting points where axle 120 is supported. In the latter case, a bearing or bushing sits inside a central hole in the wheel to allow the wheel or gear to rotate around the axle. Sometimes, especially on bicycles, the latter type axle is referred to as a spindle. Axle 120 may be an integral component of the wheel, in embodiments. In some embodiments, the axles serve to transmit driving torque to the wheel, as well as to maintain the position of the wheels relative to each other and to the bicycle frame/body. Axle 120 in trailing link suspension 100 may also bear part of the weight of the bicycle and rider plus any cargo.

Figure 2:
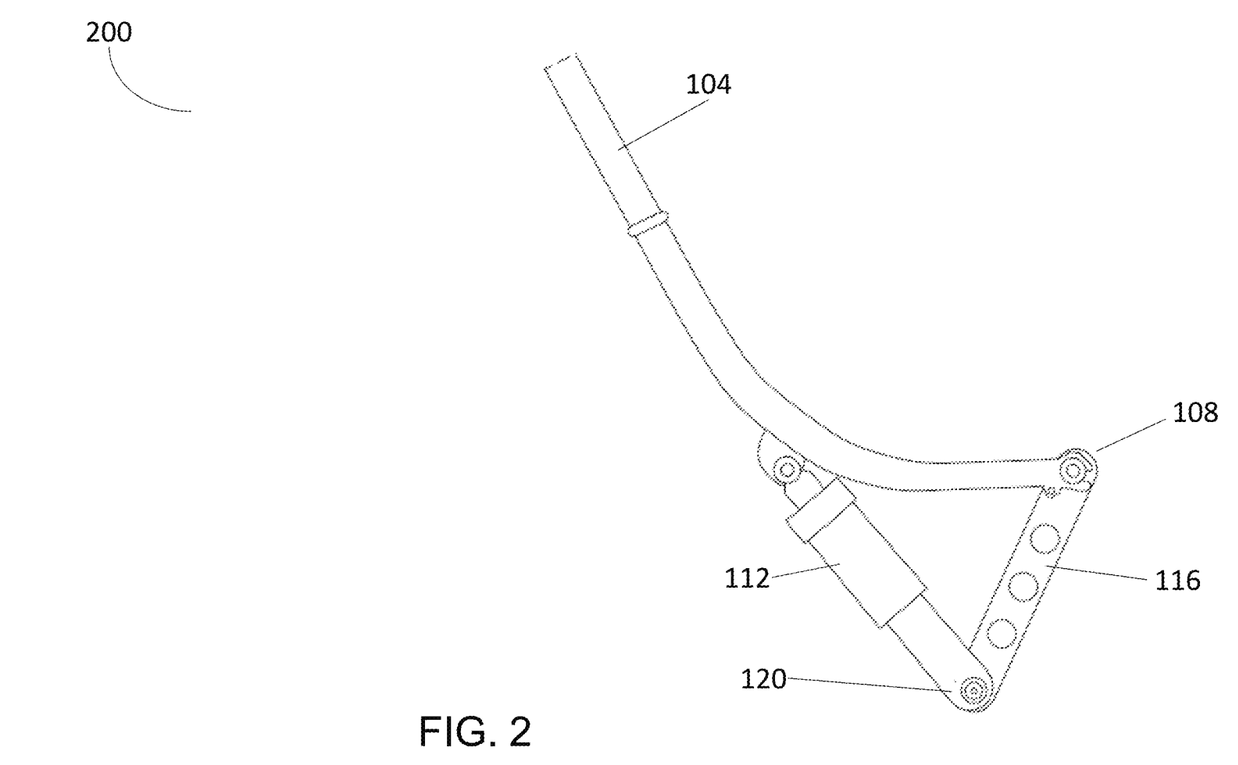
FIG. 2 is a schematic representation of a trailing link suspension for a bicycle with the shock absorber and link fixed at the axle in accordance with the disclosed subject matter.

Referring now to FIG. 2, trailing link suspension 200 is shown in side schematic view. Shock absorber 112 and link 116 are shown herein rotatably fixed to axle 120, as opposed to shock absorber 112 and being rotatably fixed to the link length between axle 120 and the link fixed at distal end 108 of fork arm 104. Suspension 200 may be configured such that the same components as suspension 100 can be adjusted such that the attachment point of shock absorber 112 can be moved to the second end of link 116 from the link length. The second end of shock absorber 112 may be fixed at the axle 120 such that the travel of the bicycle going over an obstruction is lessened, or adjusted so that the shock absorber 112 is stiffened or lessened. In some embodiments, the distal end of fork arm 104 is forward of the second end of shock absorber 112. The arrangements of linkages within suspension 100, 200 can be adjusted per rider and per riding environment.

Still referring to FIG. 2, trailing link suspension 200 may include a brake. The brake may include a drum brake as described herein above. A drum brake is a brake that uses friction caused by a set of shoes or pads that press outward against a rotating cylinder-shaped part called a brake drum. A drum brake may employ shoes that press on the inner surface of the drum. When shoes press on the outside of the drum, it is usually called a clasp brake. Where the drum is pinched between two shoes, similar to a conventional disc brake, it is sometimes called a pinch drum brake, though such brakes are relatively rare. A related type called a band brake uses a flexible belt or band wrapping around the outside of a drum.

Brakes employed with the suspension 200 may include brake calipers. Brake calipers may be disposed around the wheel of a bicycle and configured to, upon squeezing of a lever, apply pressure to at least one side of wheel and arrest the motion of the spinning wheel by friction. Further, the wheel of the bicycle may include one or more wheels fixed to the one or more sides of the wheel, this secondary wheel may include a brake caliper disposed around it, thereby applying pressure and therefore friction to the smaller wheel and due to the coupling to the larger wheel, arrests motion of the larger wheel.

Figure 3:
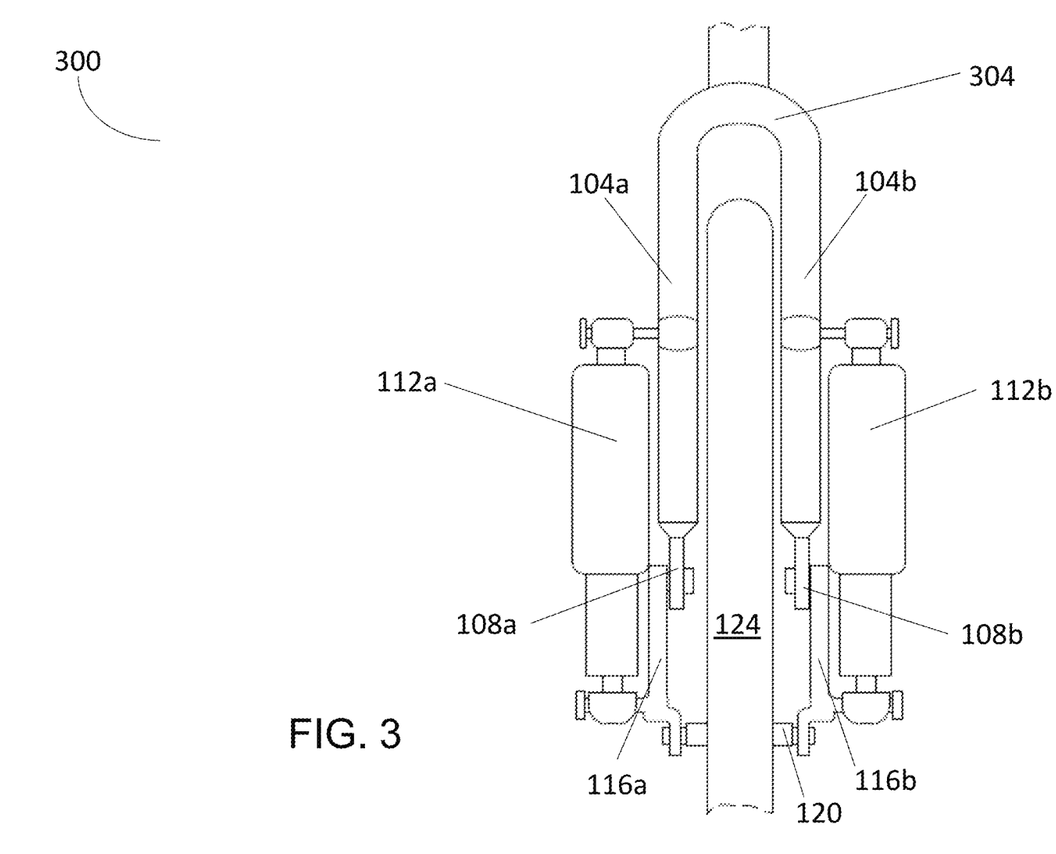
FIG. 3 is a schematic front view of the trailing link suspension disposed on both sides of a bicycle wheel.

Referring now to FIG. 3, trailing link suspension system 300 is shown in front schematic view. Trailing link suspension system 300 may be trailing link suspension 100, 200 disposed on either side of a bicycle wheel 124. The two sides of suspension system 300 may be a mirror image of one another, such that the two shock absorbers 112a, 112b are disposed at the outermost portion of suspension system 300 from relative to the wheel 124. Suspension system 300 includes a fork 304. Fork 304 includes two fork arms 104a, 104b. Fork arms 104a, 104b may join at a common junction point, for where example it meets a portion of a bike frame and can rotatably be coupled to a portion of the bike frame. Fork arms 104a, 104b may be laterally disposed and mirrored across wheel 124 such that each distal end 108a, 108b are disposed across the wheel 124 from one another. Fork arms 104a, 104b may be curved, angled, or otherwise nonlinear as described in reference to FIG. 1A-1B. Distal ends 108a, 108b may each include a flex joint as described herein above.

Still referring to FIG. 3, suspension system 300 includes two shock absorbers 112a, 112b. Each shock absorber 112a, 112b includes a first end and a second end, defining a variable length therebetween. The shock absorbers are configured to change length (the first and second ends changing the distance to each other) by absorbing impulse. For example, shock absorber 112a, 112b may include a first length under no additionally force, as for example when installed in a suspension, and another length or range of lengths when compressed. Shock absorber 112a, 112b may be configured to linearly change length, or bend, contort or otherwise change shape other than linearly to absorb force and impulse, for example like a column bending. Shock absorber 112a, 112b may include the first end rotatably fixed to the curbed length of fork arm 104a, 104b. Shock absorber 112a, 112b may include one or more holes or features configured to accept a pin coaxially installed in a feature disposed on non-linear portion of fork arm 104a, 104b. For example and without limitation, shock absorber 112a, 112b may include a hole weldably fixed to the first end of shock absorber 112a, 112b, that hole is coaxially aligned with a hole weldably fixed to the exterior of non-linear portion of fork arm 104a, 104b. In some embodiments, the hole in non-linear portion of fork arm 104 may be machined into the body of non-linear portion of fork arm 104a, 104b.

With continued reference to FIG. 3, shock absorber 112a, 112b may be any component configured to change lengths, rotate relative to one or more other components, and absorb force imparted to the suspension when a bicycle interacts with a pothole or obstruction. One of ordinary skill in the art would appreciate that shock absorber 112a, 112b is any component configured to dampen and absorb impulses. Shock absorber 112a, 112b may include a dashpot component which resists motion (linearly) via viscous friction, wherein oil is forced through one or more holes on a plunger head in a piston, in embodiments. Shock absorber 112a, 112b may include a pneumatic piston which utilizes pressure in a piston in the form of a captured gas (not limited to air) to resist motion in a linear direction. Shock absorber 112a, 112b may include a hydraulic piston which utilizes hydraulic pressure in the form of a liquid such as oil to resist linear motion. Shock absorber 112a, 112b may include a leaf spring, coil spring, or a plurality of said springs, alone or in combination. In some embodiments, shock absorber 112a, 112b may be configured to have an adjustable stiffness. For example and without a limitation the force it takes to compress a shock absorber 112a, 112b may adjustable by one or more riders or users. In some embodiments, the apertures within a piston head within a hydraulic piston may be expanded or contracted in order to increase viscous friction, thereby changing the "stiffness" of the shock absorber. Additionally or alternatively, shock absorber 112a, 112b may be configured to have adjustable travel. For the purposes of this disclosure, "travel" in reference to shock absorber 112a, 112b is the change in length of shock absorber in the expanded state versus fully compressed state.

Travel, when referring to nonlinearly traveling shock absorbers 112a, 112b may include the deflection of a bending member from an expanded state to a fully compressed state.

With continued reference to FIG. 3, suspension system 300 may be configured such that shock absorber 112a, 112b and link 116a, 116b are rotatably fixed to axle 120, as opposed to shock absorber 112a, 112b being rotatably fixed to the link length between axle 120 and the link fixed at distal end 108a/b of fork arm 104a/b. Suspension system 300 may be configured such that the same components as suspension 100, 200 can be adjusted such that the attachment point of shock absorber 112a, 112b can be moved to the second end of link 116a, 116b, respectively, from the link length. The second end of shock absorber 112a, 112b may be fixed at the axle 120 such that the travel of the bicycle going over an obstruction is lessened, or adjusted so that the shock absorber 112a, 112b is stiffened or lessened. In some embodiments, the distal end of fork arm 104a, 104b is forward of the second end of shock absorber 112a, 112b, respectively. The arrangements of linkages within suspension 100, 200, 300 can be adjusted per rider and per riding environment.

Still referring to FIG. 3, suspension system 300 includes the distal end 108a, 108b is forward of the second end of the shock absorber. The arrangement of the distal end 108a, 108b being forward of the second end of the shock absorber 112a, 112b allows for the system to compress with the shock absorber, rotating the link 116 at the distal end 108, thereby moving axle 120 up and down along with the bicycle and rider, absorbing impulses from the obstructions in the road. In some embodiments the arrangement of links may be differentiated, for example, by including shock absorber forward of the link such that the axle 120 may be substantially located in the same place. In some embodiments there may be more than one shock absorber 112 as described herein. For example and without limitation, one hydraulic piston and one pneumatic piston may be used in the same system, arranged similar to suspension system 300. For example and without limitation, there may be more than one shock absorber disposed on a single side of suspension system 300, such as in the suspension 100 or 200. Link 116 may be replaced with a secondary shock absorber 112 or the plurality of shock absorbers 112 may be arranged parallel to each other and rotatably fixed to fork arm 104a/b and link 116a/b.

Much like suspension 300 in reference to FIG. 3, the second end of shock absorbers 112a, 112b may be rotatably fixed coaxially with the second end of link 116a, 116b to axle 120. The coaxial coupling of the second end of shock absorbers 112a, 112b makes for a lower ride height of the bicycle, thereby lowering the center of gravity of the rider-bicycle system, further decreasing the instances in which a rider is thrown over the handle bars in the case of striking a pothole or obstruction in the road and/or trail.

Still referring to FIG. 3, suspension system 300 includes two links 116a, 116b disposed laterally opposite wheel 124, each link including a first end and a second end, defining a link length therebetween. Each of the links 116a, 116b are rotatably fixed to the distal ends 108a, 108b of fork arms 104a, 104b, respectively at their first ends. Additionally, each of the links 116a, 116b are rotatably fixed to axle 120 at their second ends. Suspension system 300 may include a brake or brake system as described herein above, namely caliper brakes and/or drum brakes, in embodiments.

Figure 4:
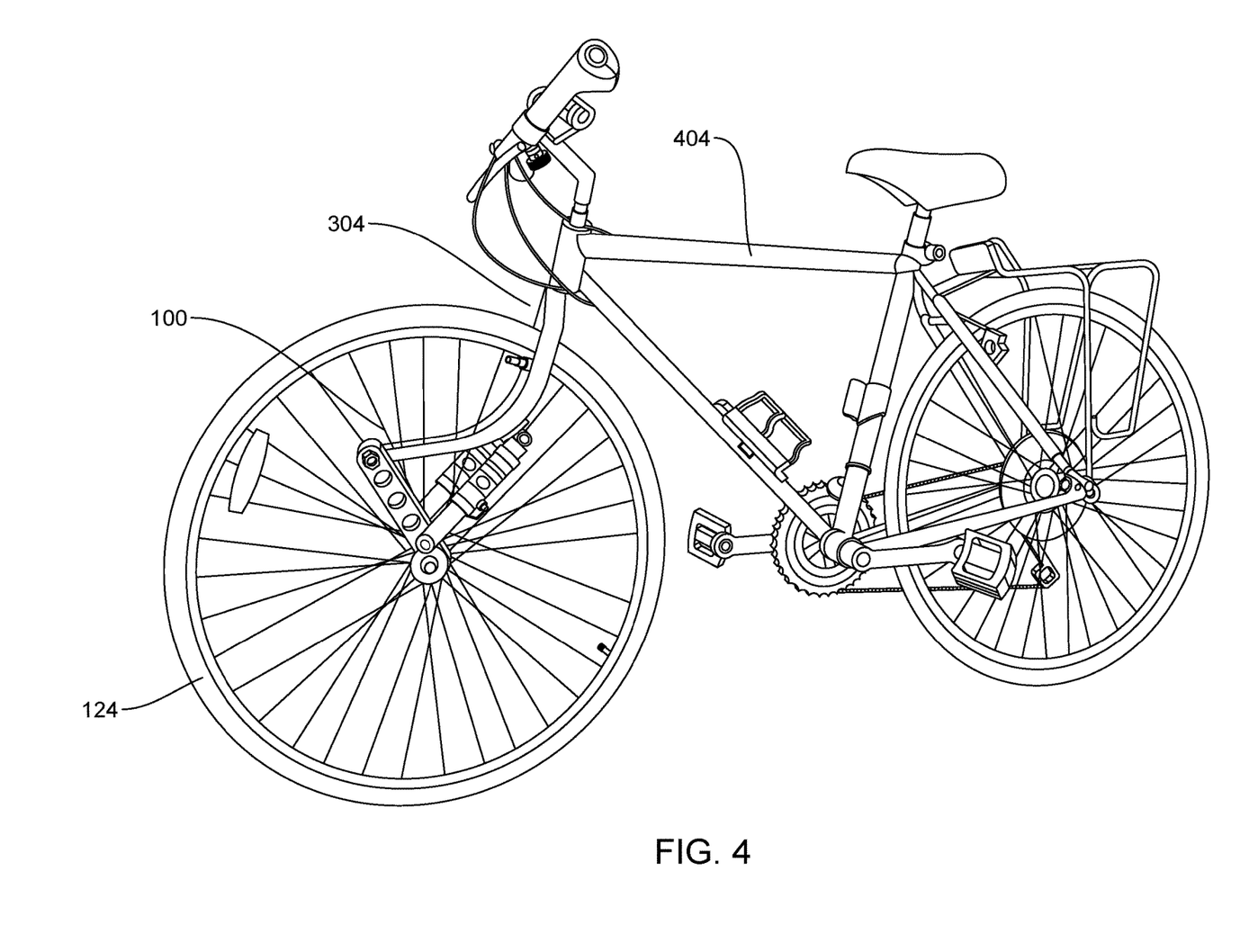
FIG. 4 is a front perspective view of the trailing link suspension installed on a bicycle.

Referring now to FIG. 4, a standard hybrid bicycle is shown in side perspective view with suspension 100 installed on the front wheel and bicycle frame. It should be noted by one of ordinary skill in the art that the herein described systems may be employed on a plurality of bicycle types, namely mountain bicycles, road bicycles, fixed gear bicycles, and racing bicycles, among others. Fork 304 is shown coupled to the front most portion of the bicycle frame 404. Fork 304 may be rotatably fixed to frame 404 such that a rider can use the handlebars there attached to steer the bicycle. The turning of fork 304 turns the wheel 124 via the fork arm 104 and link 116 attached to axle 120. Suspension 100 can be seen with shock absorbers disposed on either side of wheel 124. The links there attached may be configured to allow for alignment of axle 120 during compression of the shock absorbers. For example and without limitation, if one shock absorber were to compress a greater distance than the other shock absorber, the attachment point of link 116 and fork arm 104 (at distal end 108) may allow for tilting or slight rotation, such that the axle 120 stays parallel to the ground and perpendicular to the direction of travel of the wheel 124. For example and without limitation, even if one shock absorber (112a, 112b) applies a greater resistive force than the other, the herein disclosed system will maintain relative arrangement from axle 120 to both links 116a, 116b as a result of the fixed connection of axle 120 to links 116a, 116b.

Figure 5:
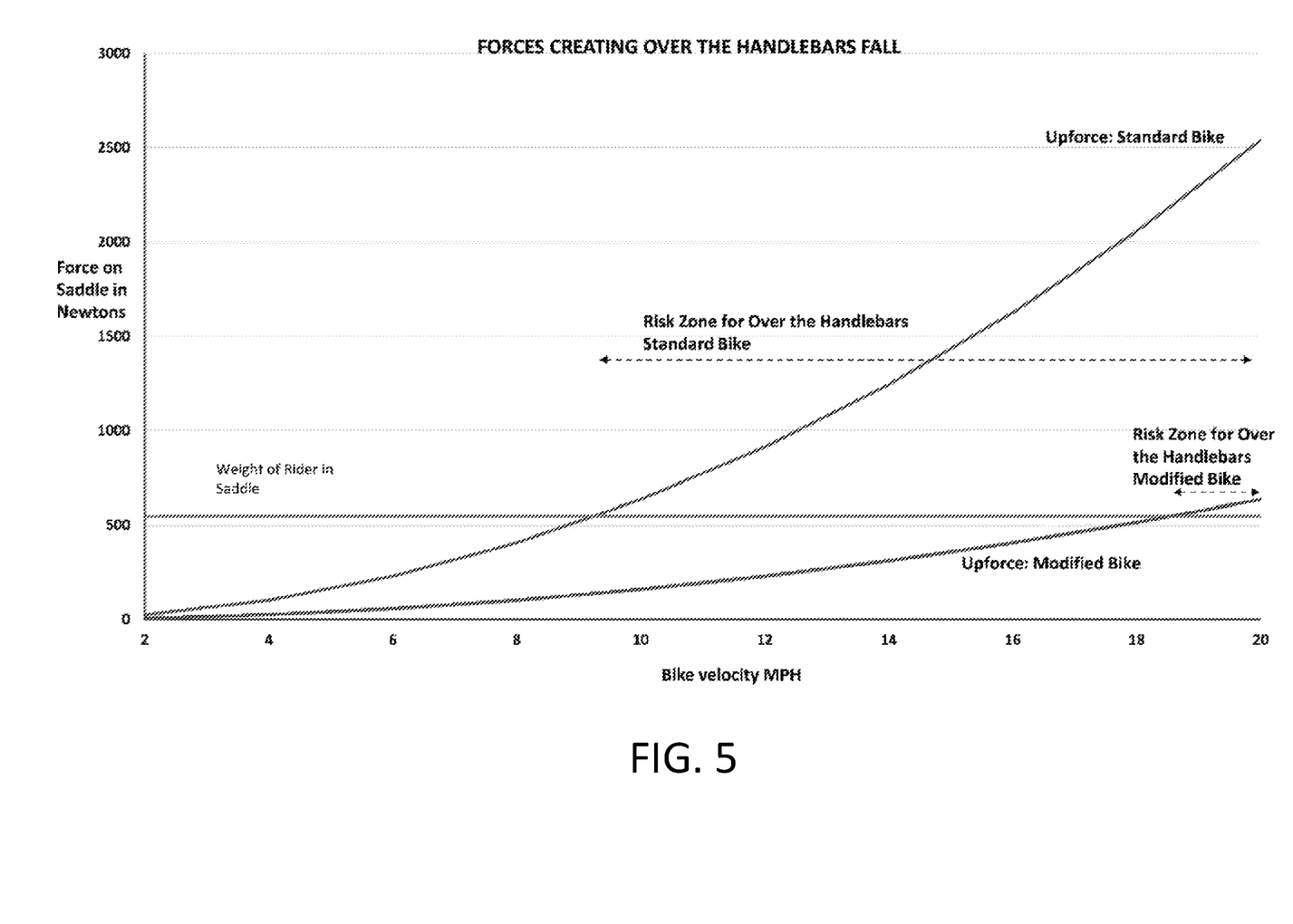
FIG. 5 is a plot of Force on Saddle vs Bike Velocity in the event of a collision with a two-inch high obstacle for a bicycle rider for a standard suspension and for the trailing link suspension.

Referring now to FIG. 5, a plot of Force on Saddle vs Bike Velocity in the event of a collision with a two-inch high obstacle is shown with a plurality of curves. The force from the weight of the rider is shown as a horizontal line (as the rider's weight does not change based on bicycle velocity). The force generated on a standard bike with a standard suspension is shown increasing and passing the rider's weight between 8 and 10 MPH. The curves above the horizontal lines are the risk zones because the force generated by the saddle during an over the handlebars fall is greater than the weight of the rider and creates the tendency for the rider to lift out of the saddle (seat of the bicycle). It can be readily seen that the risk zone for the standard bicycle is much larger than the risk zone for the bicycle utilizing the herein disclosed suspension. The risk zone for the modified bicycle is much narrower than the standard bicycle risk zone, only crossing the weight of the rider line between 18 and 20 MPH. In other words, the speed at which forces become dangerous to a rider for over the handlebars fall is nearly double in the bicycle utilizing the herein disclosed suspension than the standard bicycle.

Figure 6:
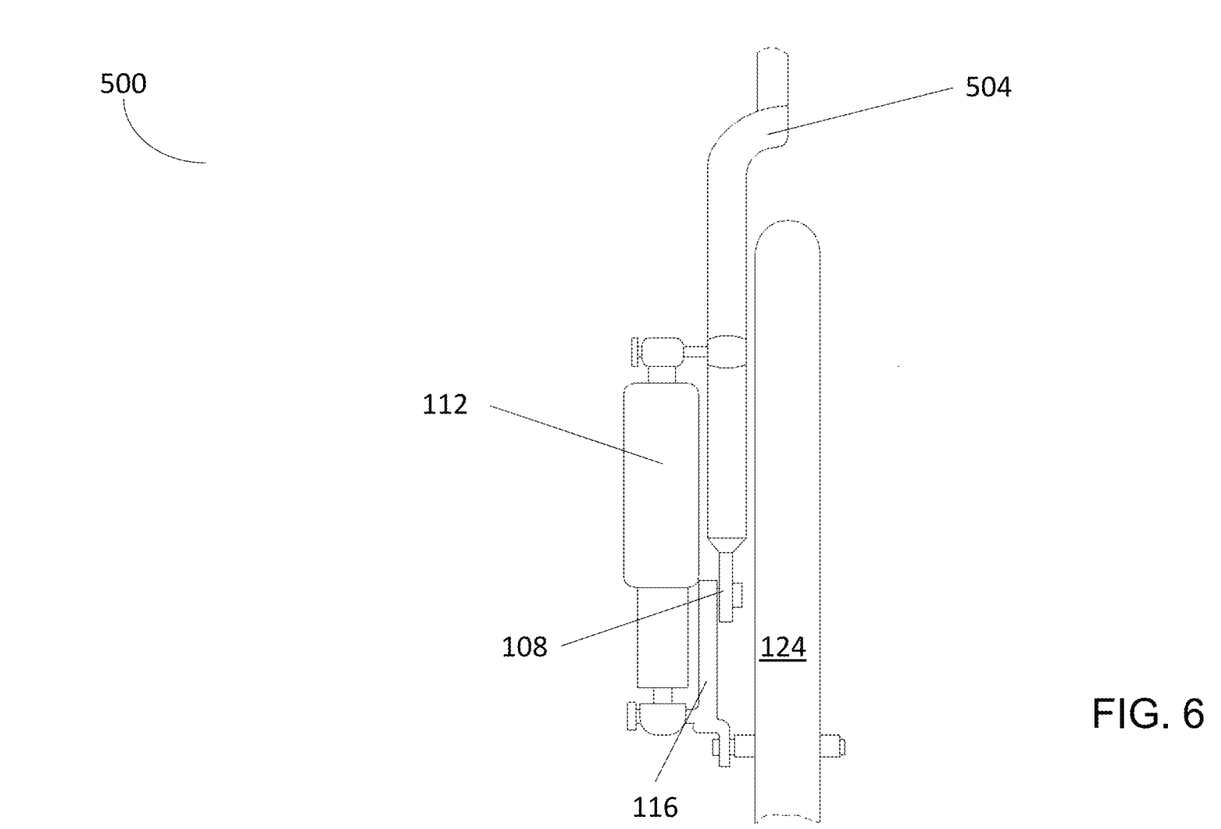
FIG. 6 is a schematic front view of a one-arm trailing link suspension system in accordance with the disclosed subject matter.

Now referring to FIG. 6, one-arm suspension system 500 is shown in a front view. One-arm suspension 500 is similar to the suspension systems described herein, namely suspension 300. One-arm suspension 500 may be largely similar by utilizing fork arm 504, which is similar to fork arm 104, but only include one arm extending from a common junction section that is rotatably fixed to a bicycle frame and configured for turning to steer. One-arm suspension may include a left or right arm configuration. One-arm fork 504 may include bracing, webbing, or struts to strengthen the asymmetrical loading experienced by fork arm 504. One arm fork 504 may be configured for use with link 116, shock absorber 112 and wheel 124 in the same arrangement as described with reference to suspension 100, 200, 300. One arm suspension 500 may eliminate the need to balance forces and/or displacement between the two sides of wheel 124 (such as the range of motion or resistive force of shock absorbers 112a, 112b). With sufficiently rigid fixing of components as described, the axle 120 may not bend out of normal relative to the fork arm 504. One-arm fork 504 may utilize any of the components as described herein, namely pneumatic, hydraulic, spring, or a combination thereof for shock absorber 112. One arm fork arm 504 may include any of the non-linear portions as described herein. One arm fork 504 may include shock absorber 112 rotatably fixed to link 116 such as in suspension 100 or shock absorber 112 fixed to axle 120 as shown in suspension 200. Any of the embodiments as described may be used in one-arm configuration described in reference to FIG. 6.

Figure 7A:
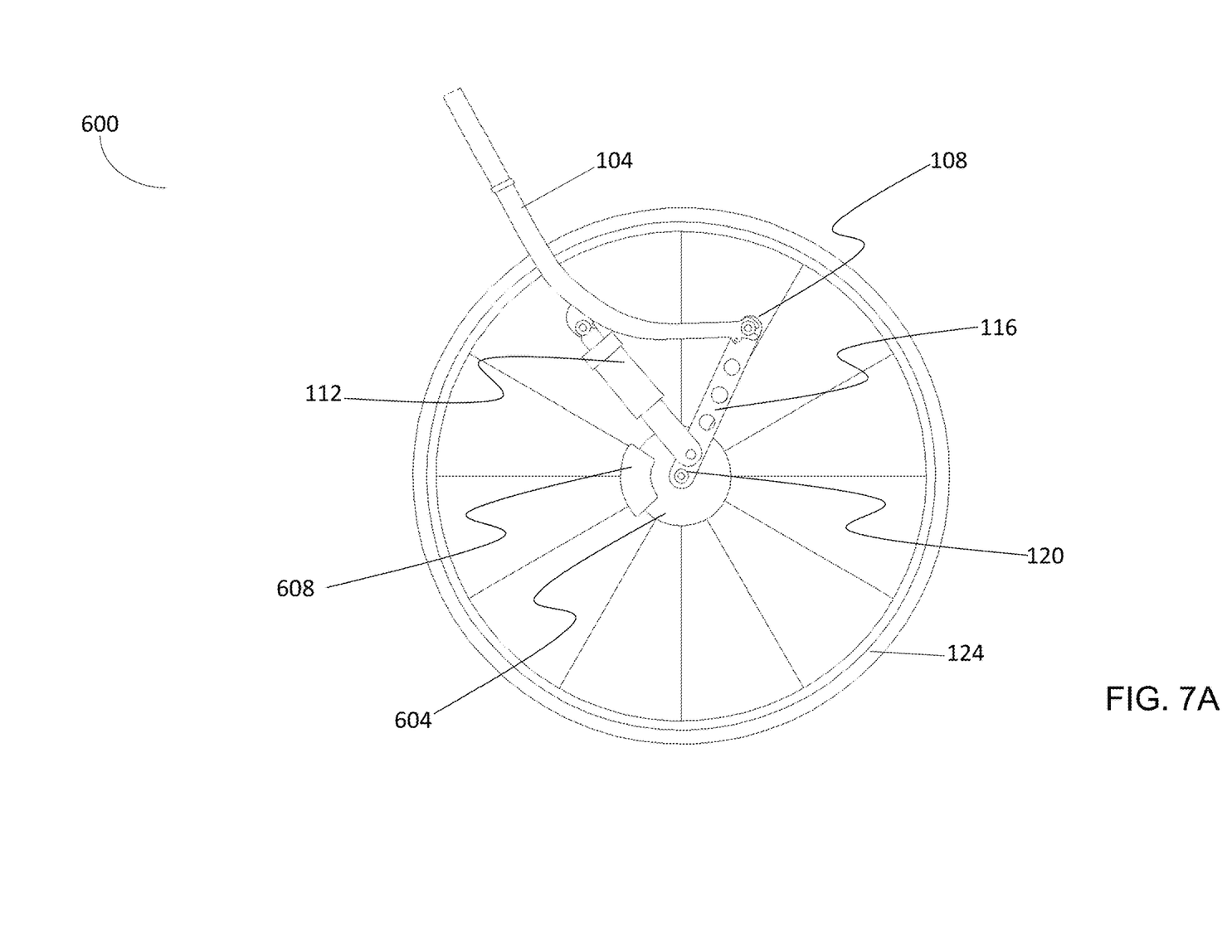
FIG. 7A is a schematic side view of a trailing link suspension system including a braking system.
Figure 7B:
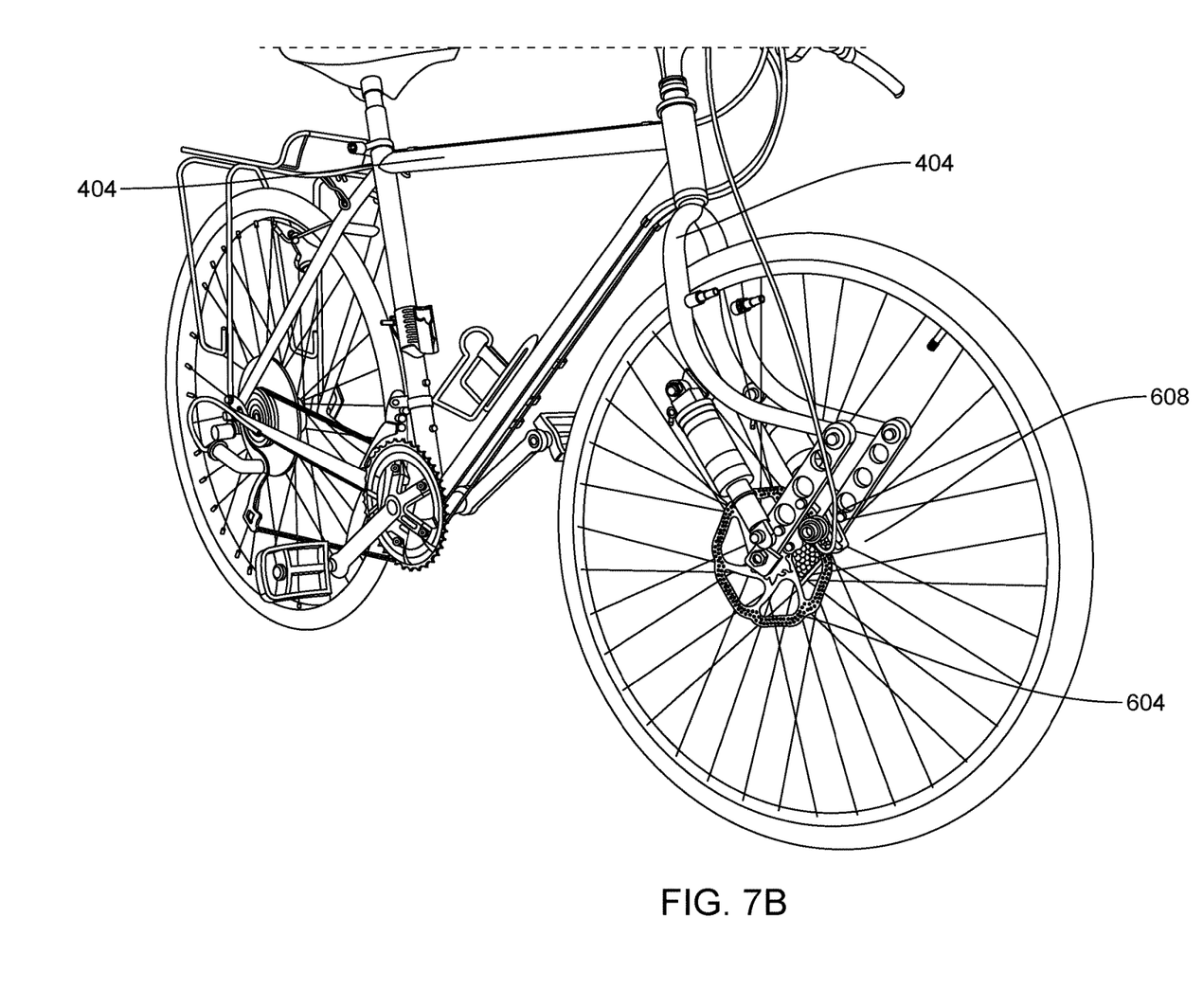
FIG. 7B is a perspective view photograph of a disc braking system installed on a trailing link bicycle suspension in accordance with the disclosed subject matter.

Referring now to FIGS. 7A and 7B, suspension 600 is shown in side view. Note the spokes on wheel 124 are for example only, and have been simplified for drawing purposes. This in no way limits the spoke arrangement, presence of spokes, or types of wheels and/or tires used with the suspension system 600 or any suspension system described herein. Suspension system 600 may be the same or similar to any suspension system as described herein, with the addition of an exemplary braking subsystem. Disc 604 can be seen as a circular component disposed next to and rigidly fixed to wheel 124. Disc 604 may be fixed to wheel 124 by rigid pins, screws, bolts, adhesives, or built in as a common component with at least part of wheel 124. As wheel 124 spins, so does disc 604 at the same rate. Disc 604 may be formed from metal such as steel, aluminum, titanium, or composite materials suitable for high heat and friction conditions. Disc 604 may include one or more cutouts, spokes, holes or other weight savings measures. Disc 604 may include cutouts disposed close to the center of disc 604, with relatively more material disposed at the edges of disc 604, especially where disc 604 is overlapped by one or more sets of calipers.

With further reference to FIGS. 7A and 7B, suspension 600 further includes one or more sets of calipers 608. Calipers 608 may be disposed on one or both sides of disc 604 and configured to actuate towards disc 604 (or pinch, if two sides are disposed around disc 604), gripping the disc between the caliper's pads, thereby arresting the rotation of the disc 604, and in turn, wheel 104. Calipers 608 may be configured to actuate in response to a pull wire being retracted as in a lever being pulled by the rider. Calipers 608 may be configured to actuate in response to one or more signals, such as electrical, radio and/or optical. Calipers 608 may be one sided, in some embodiments. For example, calipers 608 may be disposed only on one side of disc 604, and is configured to actuate towards said side of disc 604, generate friction and arrest motion of wheel 124. This is merely one example of brakes that may be employed with suspension 600 and any suspension as described herein.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A trailing link suspension for a bicycle, the trailing link suspension comprising:
    at least one fork arm, the at least one fork arm comprising a proximal end and a distal end defining a linear and a non-linear portion therebetween, wherein
        the proximal end of the fork arm is rotatably fixed to at least a portion of a bicycle frame;
    a shock absorber, the shock absorber comprising a first end and a second end, defining a variable length therebetween, the first end and the second end of the shock absorber disposed below the at least one fork arm,
        the first end of the shock absorber rotatably fixed to the non-linear portion of the fork arm; and
    a link, the link being a straight bar having a first end and a second end defining a linear link length therebetween, wherein the second end of the shock absorber is rotatably fixed to the linear link length, wherein the second end of the shock absorber is fixed to the linear link length above and forward of an axle;
        the first end of the link fixed to the distal end of the fork arm; and
        the second end of the link fixed to the axle such that the non-linear portion of the at least one fork arm and the shock absorber are in a triangular configuration with the link,
            wherein an angle formed by the shock absorber and the link is less than 90 degrees.

2. The trailing link suspension of claim 1, wherein the shock absorber is a pneumatic piston, the shock absorber disposed generally parallel with the linear portion of the fork.

3. The trailing link suspension of claim 1, wherein the shock absorber is at least one spring.

4. The trailing link suspension of claim 1, wherein the shock absorber is a hydraulic piston.

5. The trailing link suspension of claim 1, wherein the shock absorber is rotatably fixed to the non-linear portion at a first end by a pin, and rotatably fixed to the link length by a pin.

6. The trailing link suspension of claim 1, wherein the distal end of the fork arm is disposed forward of the second end of the shock absorber.

7. The trailing link suspension of claim 1, wherein the fork arm is formed from carbon fiber composite.

8. The trailing link suspension of claim 1, wherein the shock absorber comprises an adjustable stiffness.

9. The trailing link suspension of claim 1, wherein the shock absorber comprises an adjustable range of motion.

10. The trailing link suspension of claim 1, further comprising a brake.

11. A trailing link suspension for a bicycle, the trailing link suspension comprising:

a fork, the fork comprising two fork arms disposed in a parallel configuration;
 each of the two fork arms extending from a common junction to a distal end;
 each of the two fork arms comprising a linear and a non-linear portion extending from the common junction to the distal ends;
two links disposed in a parallel configuration, each of the two links being straight bars having a first end and a second end, defining a linear link length therebetween;
 each of the two links rotatably fixed to the distal end of the two fork arms, wherein each of the two links are rotatably fixed to the distal end of the two fork arms forward of an axle;
 each of the two links rotatably fixed to the axle;
two shock absorbers, each of the two shock absorbers comprising a first end and a second end, defining a variable length therebetween;
 each of the two shock absorbers rotatably fixed to the non-linear portion of each of the two fork arms at the first end of each of the two shock absorbers and rotatably fixed to the link at the second end of the each of the two shock absorbers, the first end and the second end of each of the shock absorbers disposed below the fork arms;
a wheel rotatably fixed to the axle; wherein
 each of the two shock absorbers are configured to shorten upon the wheel striking an obstruction.

12. The trailing link suspension of claim 11, wherein each of the two shock absorbers comprises a pneumatic piston, a hydraulic piston or a spring, each of the two shock absorbers disposed generally parallel with the linear portion of the fork.

13. The trailing link suspension of claim 11, wherein each of the two shock absorbers is rotatably fixed to the non-linear portion at a first end by a pin, and rotatably fixed to the link length by a pin.

14. The trailing link suspension of claim 11, wherein the distal end of each of the two fork arms is disposed forward of the second end of each of the two shock absorbers.

15. The trailing link suspension of claim 11, wherein the second end of each of the two shock absorbers are rotatably fixed coaxially with the second end of each of the two links to the axle.

16. The trailing link suspension of claim 11, wherein the fork is formed from carbon fiber composite.

17. The trailing link suspension of claim 11, wherein each of the two shock absorbers comprise an adjustable stiffness.

18. The trailing link suspension of claim 11, wherein each of the two shock absorbers comprise an adjustable range of motion.

19. The trailing link suspension of claim 11, further comprising a brake.

\* \* \* \* \*